United States Patent [19]

Alcantara Perez et al.

[11] Patent Number: 4,835,872
[45] Date of Patent: Jun. 6, 1989

[54] AUTOMATIC APPARATUS FOR DRAWING ON AND SCORING OF SHEET MATERIAL

[75] Inventors: Bernardo Alcantara Perez; Fernando Diaz-Zorita; Rodrigo Becerra Carrasco, all of Madrid, Spain

[73] Assignee: Investronica, S.A., Madrid, Spain

[21] Appl. No.: 943,196

[22] Filed: Dec. 18, 1986

[30] Foreign Application Priority Data

Dec. 20, 1985 [ES] Spain .................................. 550267

[51] Int. Cl.$^4$ ...................... B43L 15/00; G01D 15/02
[52] U.S. Cl. .......................................... 33/18.1; 33/26; 346/139 R
[58] Field of Search ................. 33/18.1, 23.11, 26, 33/32.1, 33; 346/139 R, 139 C, 140 A

[56] References Cited

U.S. PATENT DOCUMENTS

| | | | |
|---|---|---|---|
| 2,582,043 | 1/1952 | Krahulec | 346/140 A |
| 3,384,965 | 5/1968 | Sicking | 33/18.1 |
| 3,550,276 | 12/1970 | Kramer et al. | 33/18.1 |
| 3,593,426 | 7/1971 | Domagalski | 33/18.1 |
| 4,157,552 | 6/1979 | Nakajima | 33/18.1 |
| 4,324,047 | 4/1982 | Roch | 33/18.1 |
| 4,367,588 | 1/1983 | Herbert | 33/18.1 |
| 4,426,783 | 1/1984 | Gerber et al. | 33/18.1 |
| 4,467,525 | 8/1984 | Logan et al. | 33/18.2 |
| 4,577,409 | 3/1986 | Sakamoto et al. | 33/18.1 |

Primary Examiner—William A. Cuchlinski, Jr.
Assistant Examiner—Patrick R. Scanlon
Attorney, Agent, or Firm—Wenderoth, Lind & Ponack

[57] ABSTRACT

An apparatus for selectively drawing patterns on paper sheet or scoring patterns on plastic sheet which includes a table support, a sheet feeding assembly at one end of the table support and a sheet collecting assembly at the other end of the table support. A movable tool support carries a drawing instrument and a scoring instrument above the table support and an automatic data controlled system is connected thereto for moving the tool support in any direction to draw on or score the sheet material supported on the table support. The sheet material is advanced by grippers mounted on the movable tool support and spinners are supported on the sheet material at either end of the table support for operating a motor attached to the sheet collecting assembly and a brake attached to the sheet feeding assembly.

6 Claims, 8 Drawing Sheets

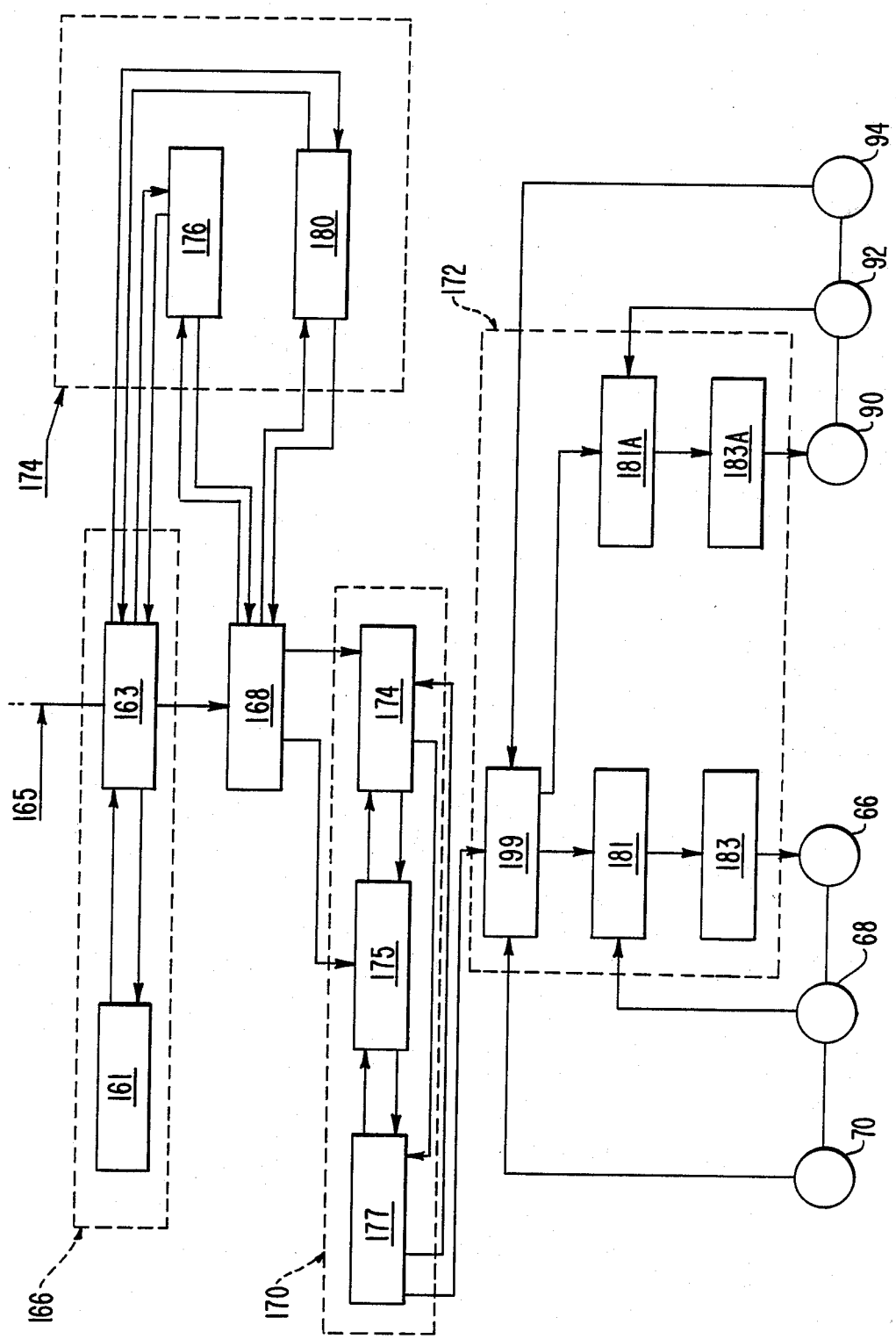

AUTOMATIC APPARATUS FOR DRAWING ON AND SCORING OF SHEET MATERIAL

BACKGROUND OF THE INVENTION

1. Field of the Invention.

The present invention relates to drawing machines, also known as plotters, which are used as computer-assisted design equipment in which movement of an instrument is achieved by numerical controls which operate either from an on-line data generator or from previously programmed data. In particular, the automatically controlled machine is suitable for use in the tailoring industry or similar industry wherein precision is required with respect to the density of lines to be drawn per unit of surface area and in which it is necessary to use an inexpensive drawing medium which is used in large quantities.

This type of industry requires the making of patterns which are used as production control elements. These patterns are made from materials which are stronger than paper, such as cardboard or plastic. The present invention is also directed at the preparation of such patterns.

2. Background of the Invention

The operating principles of drawing plotters are well-known for the two basic drum and flat prototypes, as well as for some mixed types. Also well-known are the advantages and disadvantages of one type of technology verses the other as disclosed in French Patent No. 7516659 in the name of Uri Leder of the company known as California Computer Products, Inc.

However, the application of the above-mentioned technology in the tailoring industry renders existing plotters unusable for many reasons, including the high cost associated with the large plotters developed for the aeronautical and automobile industries, as compared to those having a table for producing high precision two dimensional drawings and those purely dimensional types used in technical offices.

Specifically for this industry, a drum plotter has been developed, such as that disclosed in Spanish Patent No. 509,082, which accommodates paper reels of up to 150 meters but this plotter is disadvantageous since it requires the use of perforated paper.

Likewise, until now, the machines which have been proposed for the preparation of patterns have been independent of the drawing units and used lasers or blades as cutting tools and required special support surfaces, such as a vacuum type securing surface. As such, it has been costly to produce individual patterns.

SUMMARY OF THE INVENTION

In view of the foregoing, one of the objects of the present invention is to provide a flat plotter which is able to make very long drawings, the standard measures in the tailoring industry being from a few meters to 10–15 meters, with relatively low space requirements.

Due to the low line density per unit of surface area required and the high level of paper consumption, the plotter of the present invention is able to handle standard paper reels of up to 40 centimeters in diameter without any type of perforation.

The apparatus of the present invention is also capable of preparing patterns by scoring a plastic sheet and the patterns may easily be separated from the sheet by hand.

The present invention provides an automatic apparatus for drawing on sheet material such as paper and for scoring the surface of sheet material such as plastic, the apparatus comprising table means for supporting the sheet material, tool means disposed above the table means for selectively drawing on or scoring the surface of the sheet material supported on the table means, tool support means disposed above the table means for supporting the tool means, the support means being movable in any direction above the surface of the sheet material supported on the table means, and control means operatively connected to the tool means and to the tool support means for moving the tool support means and for causing the tool means to effect drawing on or scoring the surface of the sheet material when the tool means is moved by the tool support means.

The apparatus of the invention further comprises means for supplying the sheet material onto the table means and for collecting the sheet material from the table means. The feeding and collecting means comprises a supply reel means for supporting a roll of sheet material, brake means connected to the supply reel means for controlling delivery of the sheet material to the table means, first spinner means disposed between the supply reel means and one end of the table means, the first spinner means being movable vertically between an upper and a lower position for removing a preselected length of sheet material from the supply reel means, collecting reel means for supporting a roll of sheet material removed from the table means, motor means connected to the collecting reel means for controlling removal of the sheet material from the table means and second spinner means disposed between the collection reel means and the other end of the table means, the second spinner means being movable vertically between an upper and a lower position for removing a preselected length of sheet material from the table means, the brake means and motor means being operatively connected to the control means for actuation thereof in response to signals from the control means.

The apparatus of the present invention includes means for gripping the sheet material and moving the gripped sheet along the table means, supply stroke limiting means actuated by vertical movement of the first spinner means out of the lower position for sending a first signal to the control means which thereby intermittently actuates the brake means to maintain supply of sheet material from the supply reel means due to inertia of the first spinner means acting on the sheet material, the supply stroke limiting means further sending a second signal to the control means which thereby actuates the brake means to stop the supply of sheet material when the first spinner means returns by gravity to the lower position.

The apparatus of the present invention includes collection stroke limiting means actuated by vertical movement of the second spinner means to the lower position for sending a first signal to the control means which thereby actuates the motor means to collect sheet material on the collection reel means, the collection stroke limiting means actuated by movement of the second spinner means to the upper position for sending a second signal to the control means which thereby stops the motor means.

The tool support means of the present invention comprises guide means supported on the table means and extending a first direction, a carriage disposed above the table means and movably supported on the guide means for movement in the first direction, the carriage extending in a second direction perpendicular to the first direction, a trolley movably supported on the carriage for movement in the second direction, first drive means for driving the carriage back and forth in the first direction and second drive means for driving the trolley back and forth in the second direction. The first drive means and second drive means are each operatively connected to the control means for actuation thereof. Also, the tool support means includes gripping means for selectively gripping the sheet material supported on the table means to thereby move the sheet material in a feed direction.

The table means of the present invention includes clamping means for clamping the sheet material on the table means during the drawing or scoring operations.

The tool means of the present invention includes a frame mounted on the tool support means, a drawing instrument movably mounted on the frame, means disposed on the frame for moving the drawing instrument from a nonworking to a working position, a scoring instrument movably mounted on the frame, means for moving the scoring instrument from a nonworking to a working position, the means for moving the drawing instrument and the means for moving the scoring instrument each being operatively connected to the control means whereby either the drawing instrument or the scoring instrument can be moved into a working position to effect either drawing on or scoring of the sheet material.

The means for moving the drawing instrument includes a first tool carriage attached to the drawing instrument, means biasing the first tool carriage in a first position corresponding to the nonworking position of the drawing instrument and electromagnet means mounted on the frame and connected to the first tool carriage for moving the first tool carriage from the first position to a second position corresponding to the working position of the drawing instrument. The means for moving the drawing instrument includes means for limiting the amount of movement of the first tool carriage with respect to the frame.

The means for moving the scoring instrument includes a second tool carriage attached to the scoring instrument, means biasing of the second tool carriage in a first position corresponding to the nonworking position of the second tool and electromagnet means mounted on the frame and connected to the second tool carriage for moving the second tool carriage from the first position to a second position corresponding to the working position of the scoring instrument. The means for moving the scoring instrument includes means for limiting the amount of movement of the second tool carriage with respect to the frame.

The drawing instrument of the present invention comprises cylinder means for containing ink, a drawing tip disposed at one end of the cylinder means, a plunger disposed in the cylinder means and spaced from the drawing tip with space for an ink supply therebetween and means biasing the plunger towards the drawing tip.

The scoring instrument of the present invention comprises a tubular casing, a scoring tool having a tungsten carbide tip extending a distance from one end of the tubular casing, and means on the tubular casing for adjusting the distance that the tip end extends from the tubular casing.

BRIEF DESCRIPTION OF THE DRAWINGS

The present invention will now be described with reference to the accompanying drawings, in which:

FIG. 12 is a detailed block diagram illustrating the operations of the control means of the present invention.

DETAILED DESCRIPTION OF THE PREFERRED EMBODIMENTS

Figure 1:
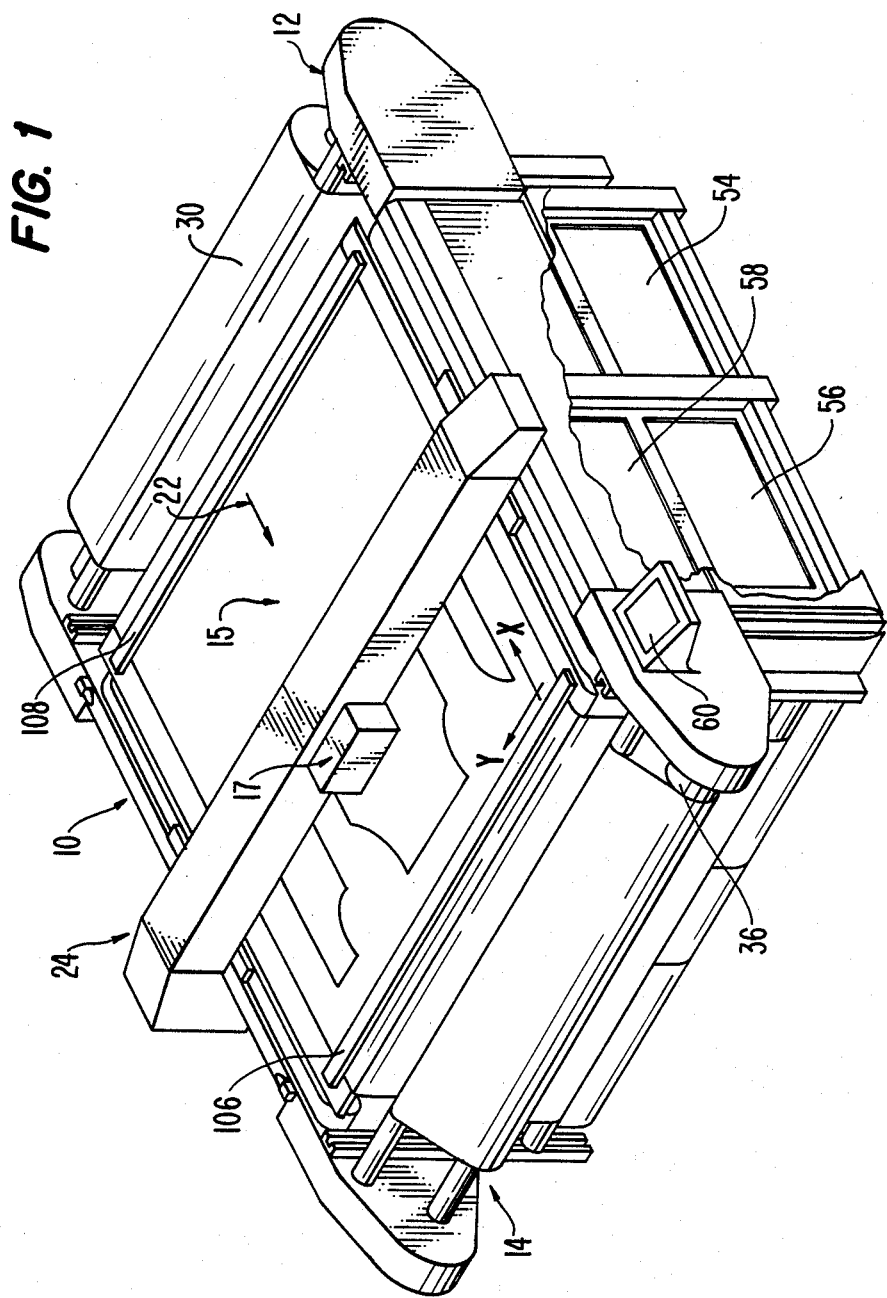
FIG. 1 is a perspective view of the machine according to the present invention.

FIG. 1 is a perspective view of the apparatus of the present invention for drawing on sheet material such as paper and for scoring the surface of sheet material such as plastic, comprising table means 10 for supporting the sheet material 15, tool means 17 disposed above the table means for selectively drawing on or scoring the surface of the sheet material supported on the table means, tool support means 24 disposed above the table means for supporting the tool means 17, the support means being movable in any direction above the surface of the sheet material supported on the table means, and control means 54, 56, 58 and 60 operatively connected to the tool means 17 and to the tool support means 24 for moving the tool support means 24 and for causing the tool means 17 to effect drawing on or scoring the surface of the sheet material when the tool means 17 is moved by the tool support means 24. The apparatus also includes a paper feed assembly 12 for supplying sheet material onto the table means and a paper collection assembly 14 for collecting the sheet material from the table means. The paper supply assembly 12 includes a supply reel means 30 and the paper collection assembly 14 includes a collection reel means 36. The paper 15 is fed from the supply reel means 30 in a feed direction 22 and the paper 15 is clamped on the table means 10 by clamping means 106 and 108 provided at either end of the table means.

Figure 2:
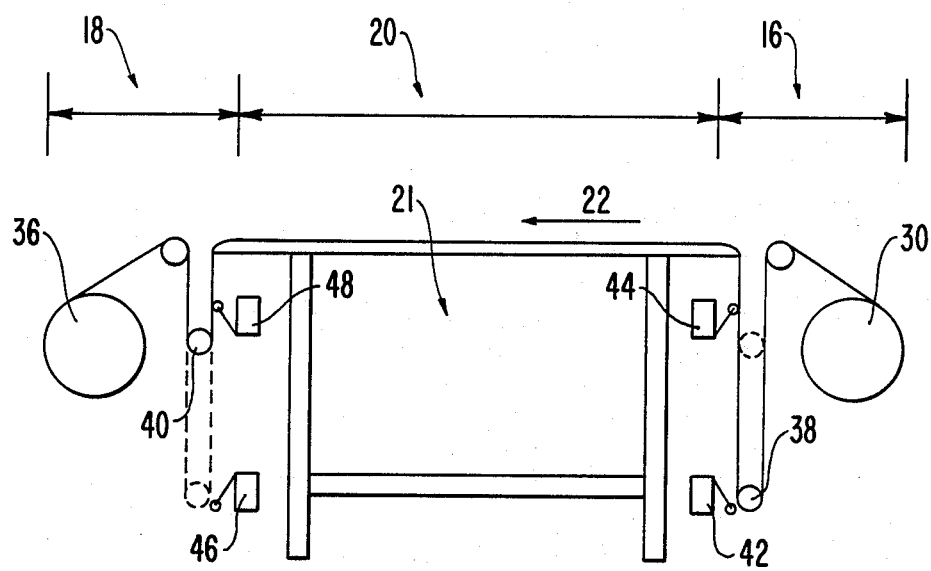
FIG. 2 is a schematic diagram of the feeding and collecting means of the present invention.
Figure 3:
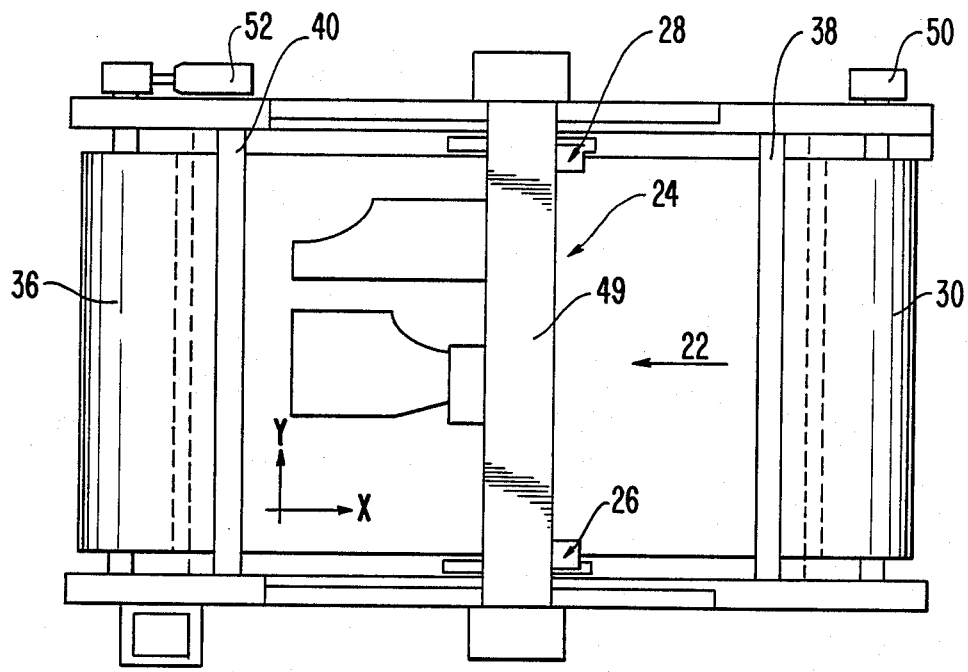
FIG. 3 is a schematic top plan view of the machine of the present invention.

FIG. 2 illustrates how the sheet material is fed to the table means from the supply reel means 30 and how the sheet material is collected from the table means by the collection reel means 36. A table support 21 is provided intermediate the supply reel means 30 and the collection reel means 36, which together comprise a supply zone 16, a drawing or scoring zone 20 and a collection zone 18. The supply reel means 30 can comprise a reel for supporting a roll of sheet material which is spaced from one end of the table support 21. A first spinner means 38 is disposed between the supply reel means 30 and the one end of the table support 21 and the first spinner means 38 is movable vertically between an upper and a lower position for removing a preselected length of sheet material from the supply reel means 30. The first spinner means 38 is supported by the sheet material and is effective to remove sheet material from the supply reel means 30 due to the weight of the spinner acting on the sheet material. As shown in FIG. 3, the supply reel means 30 is connected to a brake means 50 which controls delivery of the sheet material to the table means by preventing rotation of the supply reel means 30 when the brake means 50 is actuated. A stroke limiting means comprising an upper stroke limiter 44 and a lower stroke limiter 42 is provided to send a signal to the control means when the first spinner means 38 moves out of a lower position at which the first spinner means 38 is in contact with the stroke limiter 42. When the first spinner means 38 moves in a vertical direction upwardly away from the stroke limiter 42, the stroke limiter 42 sends a first signal to the control means which thereby intermittently actuates the brake means 50 to maintain supply of sheet material from the supply reel means 30 due to weight of the first spinner means 38 acting on the sheet material. When the first spinner means 38 returns by gravity to the lower position the stroke limiter 42 sends a second signal to the control means which thereby actuates the brake means 50 to stop the supply of sheet material from the supply reel means 30. If the first spinner means 38 reaches the upper stroke limiter 44 a signal is sent to the control means which thereby shuts down the apparatus. However, when the control means receives the first signal as mentioned above the brake means 50 is provided an intermittent on-off signal to prevent the feed reel means 30 from reaching high speeds, due to the high inertia of the rotating feed reel means 30 thus the size of the brake means 50 can be reduced and the sheet material can be removed from the supply reel means 30 by merely the influence of the weight of the first spinner means 38.

The collection zone 18 can comprise a reel means 36 for the collection of sheet material which is spaced from an end of the table support 21 opposite to the end at which the supply reel means 30 is disposed. From FIG. 3 it can be seen that motor means 52 is connected to the collection reel means 36 for controlling removal of the sheet material from the table means. A second spinner means 40 supported by the sheet material 15 is disposed between the collection reel means 36 and the table support 21 and the second spinner means 40 is movable vertically between an upper and a lower position for removing a preselected length of sheet material from the table support 21. The motor means 52 is operatively connected to the control means for actuation thereof in response to signals from the control means. The second spinner means 40 is normally maintained in the upper position in contact with an upper stroke limiter 48. However, when the second spinner means 40 moves in a vertical direction downwardly away from the upper stroke limiter 48 a first signal is sent by the stroke limiter 48 to the control means which thereby actuates the motor means 52 to collect sheet material on the collection reel means 36. When the second spinner means 40 returns to the upper stroke limiter 48 a second signal is sent to the control means which thereby deactuates the motor means and thus stops the collection of sheet material on the collection reel means 36.

It can be seen from FIG. 3 that the tool support means 24 includes gripping means 26 on one side of the tool support means 24 and gripping means 28 on the other side of the tool support means 24. The gripping means 26, 28 are movable in a direction perpendicular to the feed direction 22 for gripping sheets 15 of various widths. The gripping means 26, 28 are movable with the tool support means 24 in a direction parallel to the feed direction 22 to thereby advance a sheet of material 15 onto the table support 21. When the sheet 15 is advanced by the gripping means 26, 28 in the feed direction 22 the first spinner means 38 is moved upwardly and out of contact with the lower stroke limiter 42 which thereby sends the first signal to the control means which in turn sends an intermittent on-off signal to the brake means 50 to allow the supply reel means 30 to rotate and feed sheet material to the table support 21. Once the gripping means 26, 28 no longer move the sheet material 15 the first spinner means 38 returns by gravity to the lower stroke limiter 42 which sends the second signal to the control means which in turn actuates the brake means 50 to prevent rotation of the supply reel means 30. Likewise, when the gripping means 26, 28 advance the sheet material on the table support 21, the second spinner means 40 is allowed to move vertically downward and out of contact with the upper stroke limiter 48 which thereby sends the first signal to the control means which in turn actuates the motor means 52 to rotate the collection reel means 36 and collect sheet material thereon. When the sheet material is no longer advanced in the feed direction 22 by the gripping means 26, 28, the second spinner means 40 is returned to the upper position due to collection of the sheet material on the collection reel means 36 and once the second spinner means 40 returns to its upper position in contact with the upper stroke limiter 48 the second signal is sent to the control means which in turn deactuates the motor means 52 to stop collection of the sheet material on the collection reel means 36.

Figure 4:
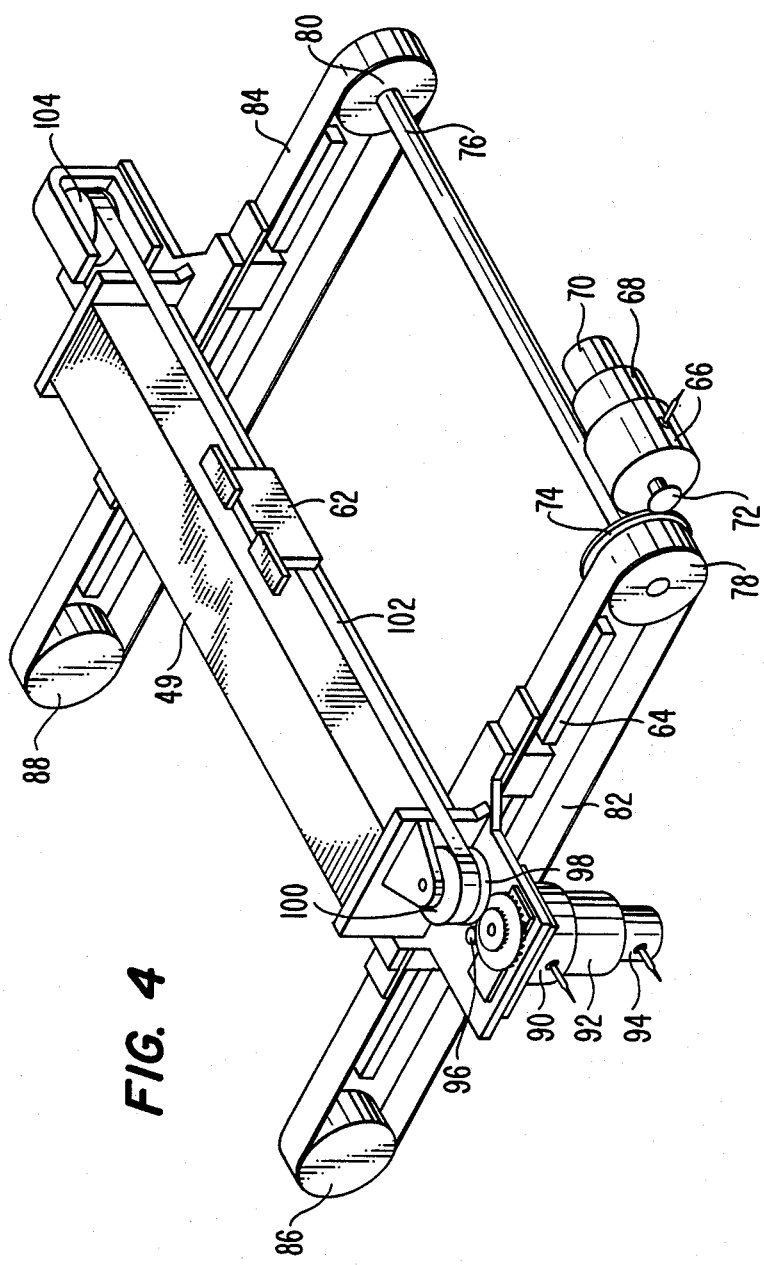
FIG. 4 is a perspective view of the tool support means of the present invention.

FIG. 4 shows the tool support means 24 in isolation from the remainder of the apparatus of the present invention. The tool support means 24 comprises guide means 64, such as a pair of T-shaped channels supported on both sides of the table support 21, the guide means 64 extending in a first direction parallel to the feed direction 22 of the sheet material, an X-carriage 49 disposed above the table means and movably supported on the guide means 64 for movement in the first direction, the X-carriage extending in a second direction perpendicular to the first direction, a Y-carriage or trolley 62 movably supported on the X-carriage 49 for movement in the second direction, first drive means for driving the carriage back and forth in the first direction and second drive means for driving the trolley back and forth in the second direction. The first drive means can comprise a pair of drive pulleys 78, 80 connected by a shaft 76 mounted for rotation on the table means 10, a pair of tension pulleys 86, 88 each of which is aligned with a respective drive pulley and mounted on the table means 10, a pair of belts 82, 84 supported for rotation on a respective pair of pulleys 78, 86 and 80, 88, the belts 82, 84 being connected to the X-carriage 49 to thereby move the X-carriage 49 upon rotation of the drive pulleys 78, 80. The drive pulley 78 is provided with gear teeth 74 which are engaged with a gear 72 mounted on a shaft of an X-motor 66. The motor 66 is reversible for operating the first drive means to thereby control movement of the X-carriage and the motor 66 is operatively connected to the control means for actuation thereof. Also attached to the motor 66 is a tachometer 68 and a position transducer 70, which are operatively connected to the control means for supplying information as to the speed and actual position of the X-carriage 49.

The second drive means for driving the trolley back and forth in the second direction comprises a drive pulley 100 mounted on one end of the X-carriage 49 and a tension pulley 104 mounted on the other end of the X-carriage 49, a belt 102 rotatably supported on the pulleys 100, 104 and connected to the trolley 62 for moving the trolley in the second direction. The drive pulley 100 includes gear teeth 98 thereon which are engaged with a gear 96 mounted on a shaft of a Y-motor 90 which is mounted on the X-carriage. The motor 90 is reversible and is connected to the control means for actuation thereof. Also connected to the motor 90 is a tachometer 92 and a position transducer 94 which are operatively connected to the control means for supplying information as to the speed and actual position of the trolley. The combined movement of the X-carriage and the trolley allows the tool means 17 to draw or score any two-dimensional figure on the sheet material.

Figure 5:
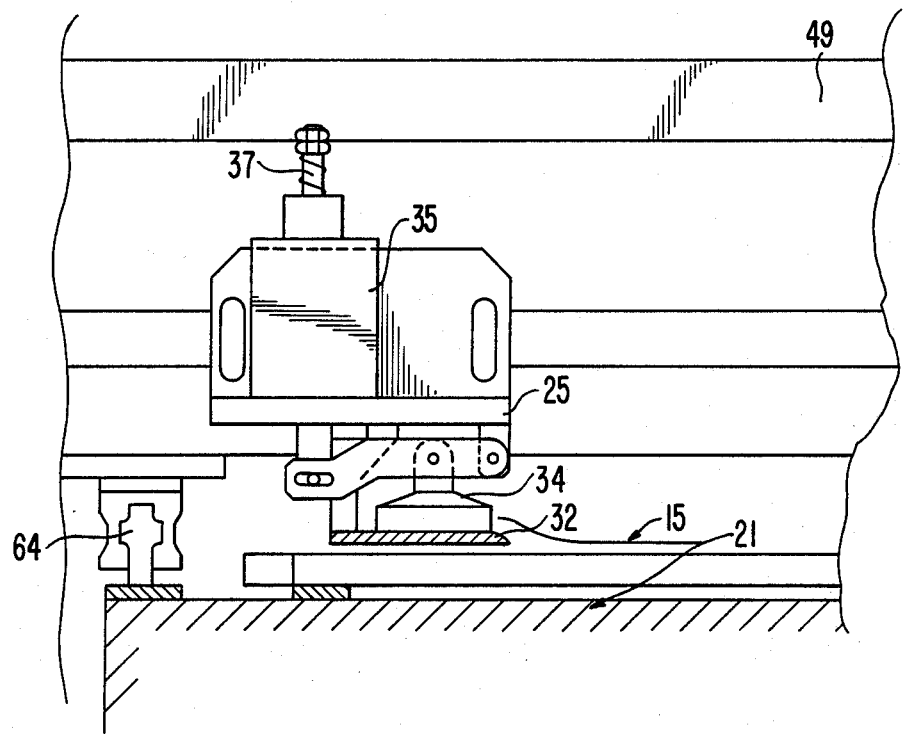
FIG. 5 is a partial cut away view showing the gripping means of the present invention.

FIG. 5 shows the gripping means 26, 28 each of which comprises a stationary jaw 32 and a movable jaw 34 which is attached to an electromagnetically operated lever pivotally connected to the shaft of an electromagnet 35. The electromagnet 35 is mounted on a movable support 25 which is fitted in a groove extending along the X-carriage 49. The shaft of the electromagnet 35 is biased in an upward position by means of a spring 37 fitted around the shaft between an upper end thereof and a stationary part of the electromagnet 35. The electromagnet 35 is operatively connected to the control means for automatic operation thereof and also to the command panel 60 for manual operation thereof.

Figure 6:
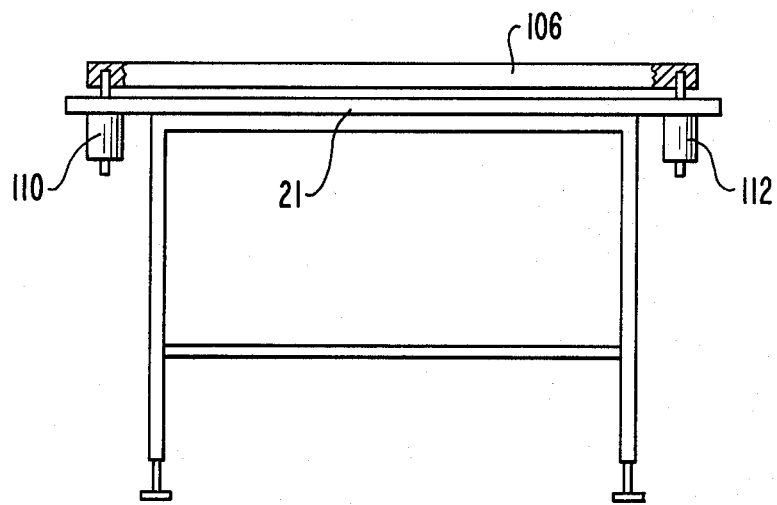
FIG. 6 is a partial cut away end view of the table support and clamping means of the present invention.

FIG. 6 shows the clamping means 106 for preventing movement of the sheet material on the table support 21 which comprises an electromagnet 110 mounted on one side of the table support 21 and an electromagnet 112 mounted on the other side of the table support 21, each electromagnet 110, 112 having a movable shaft extending upward from the table support 21 with a clamping bar extending therebetween. Each of the electromagnets 110, 112 is operatively connected to the control means whereby the electromagnets 110, 112 are raised when the sheet material is moved and are lowered when the sheet material is to be clamped on the table support 21. An arrangement similar to that just described is provided at the other end of the table support 21, as shown by the clamping means 108 in FIG. 1.

Figure 7:
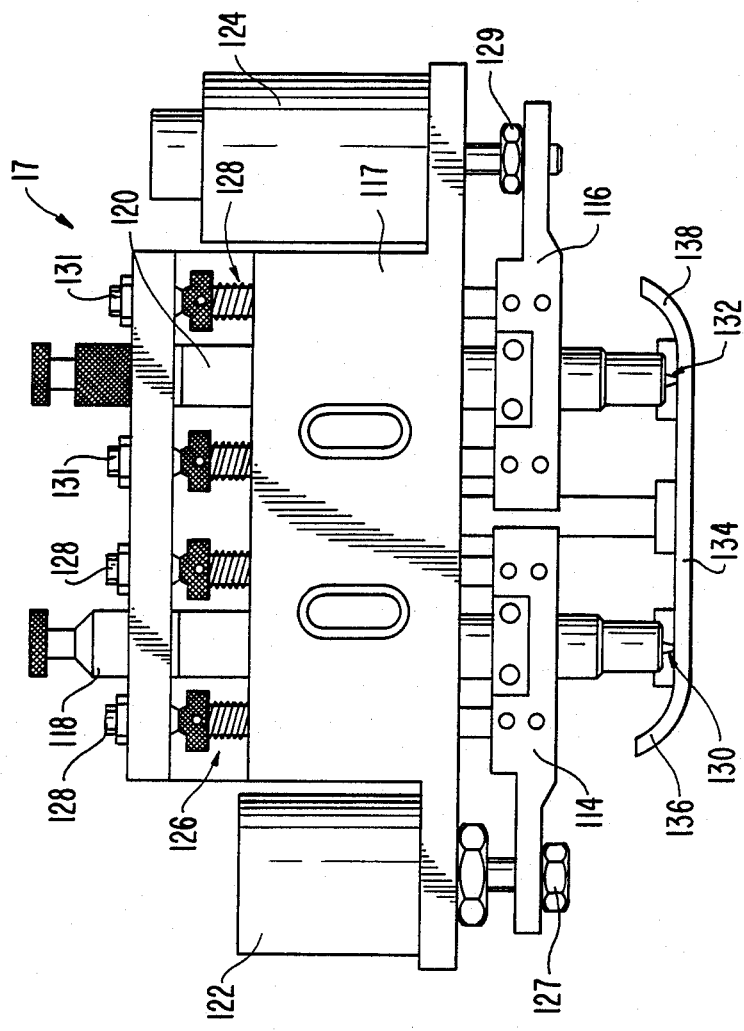
FIG. 7 is a front view of the tool means of the present invention.

FIG. 7 shows the tool means 17 in more detail. The tool means 17 comprises a frame 117 mounted on the tool support means 24, and more particularly, mounted on the trolley 62 for movement therewith, a drawing instrument 118 movably mounted on the frame 117, means disposed on the frame 117 for moving the drawing instrument 118 from a nonworking to a working position, a scoring instrument 120 movably mounted on the frame 117, means for moving the scoring instrument from a nonworking to a working position, the means for moving the drawing instrument and the means for moving the scoring instrument each being operatively connected to the control means whereby either the drawing instrument or the scoring instrument can be moved into a working position to effect either drawing on or scoring of the sheet material.

The means for moving the drawing instrument 118 includes a first tool carriage 114 attached to the drawing instrument 118, the first tool carriage 114 being mounted below the frame 117 and movably connected thereto by means of a pair of shafts which extend vertically through the frame 117, the upper ends of these shafts being biased upwardly by means 126 such as springs disposed between the frame 117 and a threaded nut on the upper end of the shafts, the frame 117 including means 128 for limiting the amount of movement of the first tool carriage 114 with respect to the frame 117, the means 128 comprising bolts which are axially aligned with the shafts attached to the first tool carriage 114, the bolts being threadedly engaged with the frame 117 for increasing or decreasing the amount of the vertical movement of the shafts attached to the first tool carriage 114. The means for moving the drawing instrument 118 also includes electromagnet means 122 having a shaft 127 which moves vertically towards the table support 21 to move the drawing instrument 118 from a nonworking position to a working position. The nut between the frame 117 and the first tool carriage 114 is threadedly engaged with the shaft 127 for adjusting the length of the stroke of the drawing instrument 118.

The means for moving the scoring instrument 120 includes a second tool carriage 116 attached to the scoring instrument 120, the second tool carriage 116 being mounted below the frame 117 and having a pair of vertical shafts extending through the frame 117 with means 123 biasing the second tool carriage upwardly, the means 123 comprising springs disposed between the frame 117 and threaded nuts screwed on the upper ends of the vertical shafts, means 131 limiting the amount of movement of the second tool carriage 116 comprising bolts which are axially aligned with the vertical shafts, the bolts being threadedly engaged with the frame 117 to limit the vertical movement of the second tool carriage. The means for moving the scoring instrument 120 also includes electromagnet means 124 mounted on the frame 117, the electromagnet means 124 having a vertically movable shaft attached to the second tool carriage 116 with means 129 such as a nut, on the vertically movable shaft for adjusting the length of the stroke of the vertically movable shaft. The electromagnet means 122, 124 are each operatively connected to the control means for selective actuation thereof to thereby move either the drawing instrument 118 or the scoring instrument 120 from a nonworking to a working position. The tool means 17 also includes a skid 134 mounted on a shaft extending below the frame 117 which prevents a point 130 of the drawing instrument 118 or a tip 132 of the scoring instrument 120 from rumpling the sheet material. The skid 134 has upturned edges 136 and 138 for allowing the skid 134 to pass smoothly over the sheet material. From the above description it will be understood that the stroke of the drawing instrument 118 is limited by adjusting bolts 127, 128 and the stroke of the scoring instrument 120 is limited by adjusting the bolts 129, 131.

Figure 8:
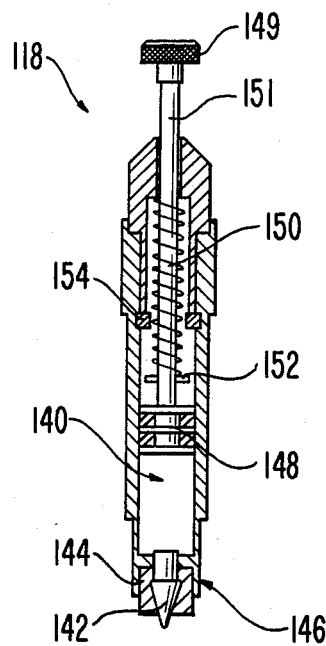
FIG. 8 is a side cross-sectional view of the drawing instrument of the present invention.

The drawing instrument 118 is illustrated in FIG. 8 and because it must be capable of high drawing speed the ink therein must be pressurized. Thus, the drawing instrument 118 comprises a cylinder means 140 for containing ink, a drawing tip 142 disposed at one end of the cylinder means 140, a plunger 148 disposed in the cylinder means 140 and spaced from the drawing tip 142 with space for an ink supply therebetween and means 150 biasing the plunger 148 towards the drawing tip 142. The drawing tip 142 is connected to the cylinder means 140 by means of a nut 144 and an 0-ring 146 fitted between the nut 144 and the cylinder means 140. A shaft 151 connected to the plunger 148 extends from an end of the cylinder means 140 opposite to the drawing tip 142. The shaft has a pin 152 disposed between the biasing means 150 and an upper end of the cylinder means 140. The biasing means 150 can comprise a spring fitted around the shaft 151 which presses against the pin 152 to pressurize the ink contained in the space between the plunger 148 and the drawing tip 142. A circular washer 154 is provided within the cylinder means 140 at a position between the plunger 148 and the end of the cylinder means 140 opposite to the drawing tip 142. The circular washer 154 includes a pair of axially extending cut outs 155, 156 for passage of the pin 152 on the shaft 151 therethrough. The shaft 151 includes a knob 149 on a free end thereof for withdrawing the plunger 148 away from the drawing tip 142 and once the pin 152 is passed through the pair of cut outs 155, 156 in the circular washer 154 the knob 149 can be turned to allow the pin 152 to rest on the circular washer 154 so that the cylinder means 140 can be filled with ink, such as by removing the nut 144, or the plunger 148 may be withdrawn to this position when the drawing instrument 118 is not to be used for a long period of time.

Figure 10:
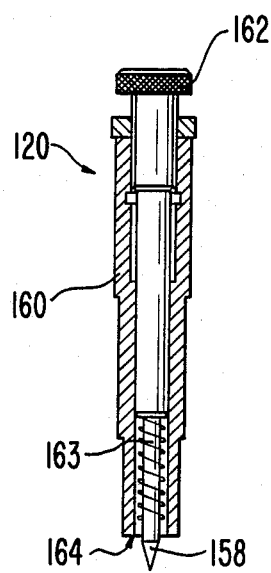
FIG. 10 is a side cross-sectional view of the scoring instrument of the present invention.
Figure 9:
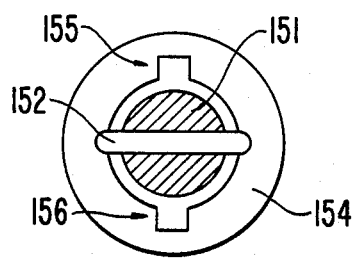
FIG. 9 is a cross-sectional view taken in a horizontal plane passing through the drawing instrument shown in FIG. 8.

The scoring instrument 120 is shown in FIG. 10 and comprises a tubular casing 160, a scoring tool having a tungsten carbide tip 158 extending a distance from one end of the tubular casing, and means 162 on the tubular casing for adjusting the distance that the tip end of the scoring tool extends from the tubular casing. It can be seen from FIG. 10 that the means 162 for adjusting the distance the tip end 158 extends from the tubular casing comprises a nut threaded into the tubular casing 160. The scoring tool is biased in contact with the nut by means of a spring 163 fitted between an end of the tubular casing 160 through which the tungsten carbide tip 158 extends and a thickened portion of the scoring tool. The tubular casing 160 includes a lower end 164 which is adapted to be supported on the upper face of the sheet material, such as plastic, whereby materials of different thicknesses can be penetrated by the tungsten carbide tip 158. Since the scoring tool can be moved at right angles to the X-Y plane it is possible to follow any irregularities in the plane and the sheet material such as plastic can be cut to a constant depth which makes it possible to later separate the scored patterns or forms from the remainder of the sheet material. The control means can be programmed such that the scored patterns or forms include identifying characters which can be drawn on them by using the drawing instrument 118.

The control means will now be described with reference to FIGS. 1, 11 and 12. As can be seen from FIG. 1, the apparatus of the present invention includes a command panel 60 which allows an operator to manually perform operations with the apparatus according to the present invention, a feed supply module 54, a control module 56 and a servo and power module 58. An input/output line 165 interconnects the modules 54, 56, 58 and an external processing system (not shown). The input/output line is an asynchronous standardized serial line which carries digitalized information regarding the pattern or form to be drawn by the drawing instrument or scored by the scoring instrument.

Figure 11:
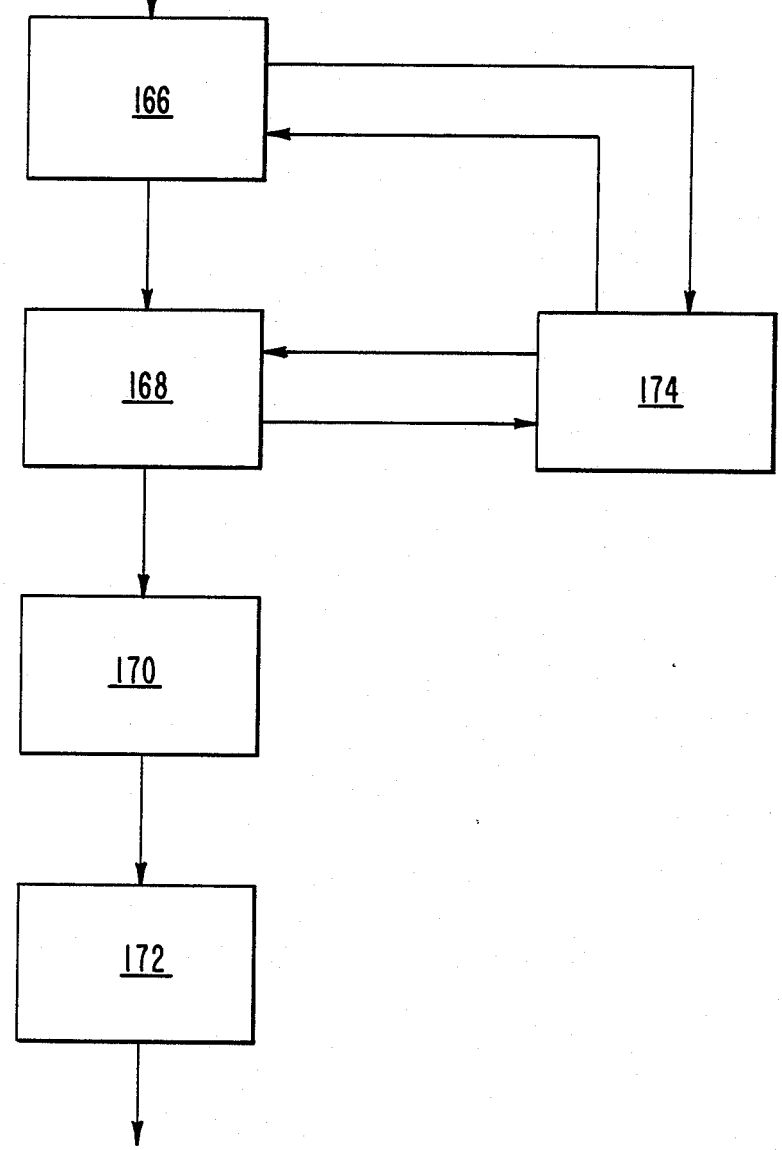
FIG. 11 is a schematic diagram of the control means of the present invention.

FIG. 11 is a schematic representation of the operations of the control means which comprises a master computer 166 which receives data through the input-/output line 165, a slave computer 168, an X-Y computer 170, control stages 172 and logic for the ancillary elements 174. The master computer 166 comprises a CPU (controller processing unit) 161 and a peripheral card 163. The CPU 161 interpolates digitalized data received through the input/output line 165 and once the dynamic calculation has been made for the movement of the tool support means 24, the slave computer 168 is advised by means of the peripheral card 163 of the X and Y increments which are required and at the proper timing that they are to occur.

The CPU 161 consists of an eight bit micro-computer which contains the machine control program housed in an erasable programmable read only memory (EPROM) and 32K of random access memory (RAM). The peripheral card 163 receives information through the line 165 and sends information to the slave computer 168 as well as receives information from the command panel 60 by means of I/O cards 176.

The slave computer 168 is made up of an eight bit micro-computer with 8K EPROM and 4K RAM memory, as well as integrated circuits for communication with the command panel 60, the X-Y computer 170 and the electromechanical systems of the apparatus according to the present invention. The X-Y computer 170 receives information in impulse form corresponding to the amount of movement necessary for the shafts of the X-motor 66 and Y-motor 90. The data in impulse form is grouped in the corresponding quartet for increases in X and Y and the number of impulses accelerating and at constant speed, these latter two corresponding to the dominant axis (that of greatest increase) and delivers to the control loops of each axis the impulses with the appropriate sequencing for operating the motors of each of the shafts. To accomplish this result, the X-Y computer 170 comprises the components of an acceleration ramps generator 173, a logic arithmetic unit (ALU) 175 and a sequencer 177. The generator 173 is designed to generate the impulses to be sent to the position loop of each shaft and, in addition, to generate them at the correct moment, which is done by varying the frequency of impulses from a clock, according to the data incorporated in an EPROM memory which has recorded the time between successive impulses, on the basis on the number of impulses given since the rest point. This whole process is carried out with the ALU 175 which is intended to generate the information for the dominant and slave axis in each straight segment, and to the sequencer 177 which controls the process.

The control stages 172 are responsible for supplying voltage and current to the X-motor 66 and Y-motor 90 on the basis of the impulses delivered by the X-Y computer 170. The position transducers, 70 and 94, are encoders, which feed back the signal position in impulse form to an encoder card 199 which subtracts them from those it receives from the X-Y computer 170 and sends a voltage to control stages 181 and 181A which is in proportion to the difference between the two signals. The previous voltage signal together with the speed signals provided by tachometers 68 and 92, are fed to the control stages 181 and 181A, which contain servo stabilization networks, and finally, power stages 183 and 183A amplify the signal of the previous stages and supply the current required to the X-motor 66 and Y-motor 90, respectively.

The logic for the ancillary elements 174 is designed to supply the power to the electromagnets for the gripping means 26, 28, the electromagnets for the clamping means 106, 108, the electromagnet for the drawing instrument 118 and the electromagnet for the scoring instrument 120, etc., and to receive the signals from the different stroke limiters of the machine and command panel 60, preparing them and delivering them to the different micro-computers. The information I/O function is carried out in card 176 while card 180 is responsible for the operation of the electromagnets, brake means 50, motor means 52, etc.

While the invention has been described with reference to the foregoing embodiments, it should be understood that various changes and modifications may be made without departing from the spirit and scope of the invention.

We claim:

1. An automatic apparatus for drawing on sheet material such as paper and for scoring the surface of sheet material such as plastic, comprising:

table means for supporting the sheet material;

tool means disposed above said table means for selectively drawing on or scoring the surface of the sheet material supported on said table means;

tool support means disposed above said table means for supporting said tool means, said support means being movable in any direction in a plane parallel to the surface of the sheet material supported on said table means;

control means operatively connected to said tool means and to said tool support means for moving said tool support means and for causing said tool means to effect drawing on or scoring the surface of the sheet material when said tool means is moved by said tool support means; and said tool means including a frame mounted on said tool support means, a drawing instrument movably mounted on said frame, means disposed on said frame for moving said drawing instrument from a nonworking to a working position, a scoring instrument having a conically shaped scoring tip movably mounted on said frame, means for moving said scoring instrument form a nonworking to a working position, said means for moving said drawing instrument and said means for moving said scoring instrument each being operatively connected to said control means whereby either said drawing instrument or said scoring instrument can be moved into a working position to effect either drawing on or scoring of the sheet material, said means for moving said drawing instrument including a first tool carriage attached to said drawing instrument, means biasing said first tool carriage in a first position corresponding to the nonworking position of said drawing instrument and first electromagnetic means mounted on said frame and connected to said first tool carriage for moving said first tool carriage from said first position to a second position corresponding to said working position of said drawing instrument, said means for moving said scoring instrument including a second tool carriage attached to said scoring instrument, means biasing said second tool carriage in a first position corresponding to the nonworking position of said scoring instrument and second electromagnet means mounted on said frame and connected to said second tool carriage for moving said second tool carriage from said first position to a second position corresponding to said working position of said scoring instrument, said first tool carriage being connected to said drawing instrument at a position between said frame and said table means, said first electromagnet means comprising an electromagnet supported by said frame and a plunger shaft movably mounted in said electromagnet for movement towards and away from said table means, said plunger shaft extending through an opening in said first tool carriage and having a head at a free end thereof, aid plunger shaft further having a nut threadedly engaged therewith at a position between said frame and said first tool carriage for limiting movement of said first tool carriage with respect to said frame.

2. An automatic apparatus for drawing on sheet material such as paper and for scoring the surface of sheet material such as plastic, comprising:

table means for supporting the sheet material;

tool means disposed above said table means for selectively drawing on or scoring the surface of the sheet material supported on said table means;

tool support means disposed above said table means for supporting said tool means, said support means being movable in any direction in a plane parallel to the surface of the sheet material supported on said table means;

control means operatively connected to said tool means and to said tool support means for moving said tool support means and for causing said tool means to effect drawing on or scoring the surface of the sheet material when said tool means is moved by said tool support means and said tool means including a frame mounted on said tool support, means, a drawing instrument movably mounted on said frame, means disposed on said frame for moving said drawing instrument from a nonworking to a working position, a scoring instrument having a conically shaped scoring tip movably mounted on said frame, means for moving said scoring instrument from a nonworking to a working position, said means for moving said drawing instrument and said means for moving said scoring instrument each being operatively connected to said control means whereby either said drawing instrument or said scoring instrument can be moved into a working position to effect either drawing on or scoring of the sheet material, said means for moving said drawing instrument including a first tool carriage attached to said drawing instrument, means biasing said first tool carriage in a first position corresponding to the nonworking position of said drawing instrument and first electromagnet means mounted on said frame and connected to said first tool carriage for moving said first tool carriage from said first position to a second position corresponding to said working position of said drawing instrument, said means for moving said scoring instrument including a second tool carriage attached to said scoring instrument, means biasing said second tool carriage in a first position corresponding to the nonworking position of said scoring instrument and second electromagnet means mounted on said frame and connected to said second tool carriage for moving said second tool carriage from said first position to a second position corresponding to said working position of said scoring instrument, said means biasing said first tool carriage in said first position comprising a pair of carriage bolts connected at one end thereof to said first tool carriage on either side of said drawing instrument, respectively, said pair of carriage bolts being slidably received in said frame and having free ends at the other end thereof extending outwardly from a surface of said frame, said pair of bolts having respective nuts threadedly engaged therewith at a position between said free ends and said surface of said frame and respective springs being compressed between said nuts and said surface of said frame for biasing said first tool carriage in said first position.

3. The automatic apparatus of claim 2, further comprising a pair of adjusting bolts axially aligned with said pair of carriage bolts, said adjusting bolts having lower ends thereof engageable with said free ends of said carriage bolts, respectively, said pair of adjusting bolts being threadedly engaged with a portion of said frame overlying said free ends of said carriage bolts for adjusting a distance traveled by said carriage bolts.

4. An automatic apparatus for drawing on sheet material such as paper and for scoring the surface of sheet material such as plastic, comprising:

table means for supporting the sheet material;

tool means disposed above said table means for selectively drawing on or scoring the surface of the sheet material supported on said table means;

tool support means disposed above said table means for supporting said tool means, said support means being movable in any direction in a plane parallel to the surface of the sheet material supported on said table means;

control means operatively connected to said tool means and to said tool support means for moving said tool support means and for causing said tool means to effect drawing on or scoring the surface of the sheet material when said tool means is moved by said tool support means; and said tool means including a frame mounted on said tool support means, a drawing instrument movably mounted on said frame, means disposed on said frame for moving said drawing instrument from a nonworking to a working position, a scoring instrument having a conically shaped scoring tip movably mounted on said frame, means for moving said scoring instrument from a nonworking to a working position, said means for moving said drawing instrument and said means for moving said scoring instrument each being operatively connected to said control means whereby either said drawing instrument or said scoring instrument can be moved into a working position to effect either drawing on or scoring of the sheet material, said means for moving said drawing instrument including a first tool carriage attached to said drawing instrument, means biasing said first tool carriage in a first position corresponding to the nonworking position of said drawing instrument and first electromagnet means mounted on said frame and connected to said first tool carriage for moving said first tool carriage from said first position to a second position corresponding to said working position of said drawing instrument, said means for moving said scoring instrument including a second tool carriage attached to said scoring instrument, means biasing said second tool carriage in a first position corresponding to the nonworking position of said scoring instrument and second electromagnet means mounted on said frame and connected to said second tool carriage for moving said second tool carriage form said first position to a second position corresponding to said working position of said scoring instrument, said second tool carriage being connected to said scoring instrument at a position between said frame and said table means, said second electromagnet means comprising an electromagnet supported by said frame and a plunger shaft movably mounted in said electromagnet for movement towards and away from said table means, said plunger shaft extending through an opening in said second tool carriage and having a head at a free end thereof, said plunger shaft further having a nut threadedly engaged therewith at a position between said frame and said second tool carriage for limiting movement of said second tool carriage with respect to said frame.

5. An automatic apparatus for drawing on sheet material such as paper and for scoring the surface of sheet material such as plastic, comprising:

table means for supporting the sheet material;

tool means disposed above said table means for selectively drawing on or scoring the surface of the sheet material supported on said table means;

tool support means disposed above said table means for supporting said tool means, said support means being movable in any direction in a plane parallel to the surface of the sheet material supported on said table means;

control means operatively connected to said tool means and to said tool support means for moving said tool support means and for causing said tool means to effect drawing on or scoring the surface of the sheet material when said tool means is moved by said tool support means; and said tool means including a frame mounted on said tool support means, a drawing instrument movably mounted on said frame, means disposed on said frame for moving said drawing instrument from a nonworking to a working position, a scoring instrument having a conically shaped scoring tip movably mounted on said frame, means for moving said scoring instrument from a nonworking to a working position, said means for moving said drawing instrument and said means for moving said scoring instrument each being operatively connected to said control means whereby either said drawing instrument or said scoring instrument can be moved into a working position to effect either drawing on or scoring of the sheet material, said means for moving said drawing instrument including a first tool carriage attached to said drawing instrument, means biasing said first tool carriage in a first position corresponding to the nonworking position of said drawing instrument and first electromagnet means mounted on said frame and connected to said first tool carriage for moving said first tool carriage from said first position to a second position corresponding to said working position of said drawing instrument, said means for moving said scoring instrument including a second tool carriage attached to said scoring instrument, means biasing said second tool carriage in a first position corresponding to the nonworking position of said scoring instrument and second electromagnet means mounted on said frame and connected to said second tool carriage for moving said second tool carriage from said first position to a second position corresponding to said working position of said scoring instrument, said means biasing said second tool carriage in said first position comprising a pair of carriage bolts connected at one end thereof to said second tool carriage on either side of said scoring instrument, respectively, said pair of carriage bolts being slidably received in said frame and having free ends at the other end thereof extending outwardly from a surface of said frame, said pair of carriage bolts having respective nuts threadedly engaged therewith at a position between said free ends and said surface of said frame and respective springs being compressed between said nuts and said surface of said frame for biasing said second tool carriage in said first position.

6. The automatic apparatus of claim 5, further comprising a pair of adjusting bolts axially aligned with said pair of carriage bolts, said adjusting bolts having lower ends thereof engageable with said free ends of said carriage bolts, respectively, said pair of adjusting bolts being threadedly engaged with a portion of said frame overlying said free ends of said carriage bolts for adjusting a distance traveled by said carriage bolts.

* * * * *